United States Patent [19]

Williams

[11] Patent Number: 4,589,727
[45] Date of Patent: May 20, 1986

[54] OPTICAL FIBER RETAINER

[75] Inventor: Russell H. Williams, Flemington, N.J.

[73] Assignee: Thomas & Betts Corporation, Raritan, N.J.

[21] Appl. No.: 527,440

[22] Filed: Aug. 29, 1983

[51] Int. Cl.⁴ .............................................. G02B 6/36
[52] U.S. Cl. ............................... 350/96.20; 350/96.23
[58] Field of Search .......................... 81/3 R; 29/270; 350/96.2, 96.22, 96.23

[56] References Cited

U.S. PATENT DOCUMENTS 4,172,746 10/1979 La Noane et al. ........... 350/96.22 X
4,441,786 4/1984 Hulin et al. ................. 350/96.22 X

FOREIGN PATENT DOCUMENTS 1409303 10/1975 United Kingdom ............ 350/96.23

Primary Examiner—John Lee
Assistant Examiner—Lester Rushin, III
Attorney, Agent, or Firm—Robert M. Rodrick; Salvatore J. Abbruzzese

[57] ABSTRACT

An optical fiber retaining member for insertion into a tubular optical cable. The retaining member includes a fiber accommodating surface for supporting the fiber and placing the fiber in frictional engagement between the inner wall of the tubular cable and the fiber accommodating surface. A plurality of fibers extending from a single cable can be supported in similar fashion with a retaining member having a plurality of fiber accommodating surfaces.

10 Claims, 7 Drawing Figures

OPTICAL FIBER RETAINER

FIELD OF THE INVENTION

The present invention relates generally to an optical fiber securement member and more particularly to a separating and retaining member which secures optical fibers in a fiber optic cable.

BACKGROUND OF THE INVENTION

The use of optical fibers for light transmission has become increasingly popular especially in the area of data, telephone and other types of communication networks. Opto-electronics is now seen as a suitable companion with many traditional electronic communication systems.

One type of fiber optic cable called "loose tube" cable comprises one or more optical fibers encased in an outer jacket. Loosely positioned stranded strenghtening members are typically positioned between the fibers and the jacket. The inner diameter of the outer jacket is several times larger than the diameter of the fibers, thus the fiber are arranged in a loose fit configuration. The fibers are free to move about in the jacket and can even move longitudinally within the jacket. This arrangement allows the cable to be flexed, bent or pulled without transmitting the forces directly to the fibers. While this arrangement adequately protects the fibers, it presents a problem in terminating the fiber for interconnection.

Typically, in terminating an optical cable, the outer jacket is stripped away exposing an extending length of fiber. This extending portion is inserted into a fiber optic termination device. As the fiber is loosely held in the jacket, there is a tendency upon insertion, for the fiber to back into the jacket thereby making termination difficult. Also when employing a cable having a plurality of fibers, it is difficult to manually separate the fibers for individual insertion into particular sections of the termination device.

It is desirous to provide an optical cable retaining device which would prevent the fibers from backing into the cable upon termination. Further it is desirous to provide a device which will separate fibers in a plural fiber optic cable.

SUMMARY OF THE INVENTION

It is a primary object of the present invention to provide a fiber securement member which will support and hold fibers in a tubular optical cable.

It is a further object of the present invention to provide a fiber separating member which will separate the individual fibers extending from a cable, to facilitate ease of termination.

The invention looks toward providing an elongate member having a plurality of fiber accomodating surfaces which frictionally support the fiber between the inner wall of the optical cable and the surfaces themselves. The elongate member is dimensioned to be frictionally inserted into the cable thus snugly holding the fibers therein. The frictional support of the fibers against the inner wall of the cable is sufficient to prevent the fibers from backing into the cable upon termination.

In a preferred embodiment for use with cables having a pair of fibers extending therethrough, the present invention provides an elongate member having a pair of opposed spaced-apart fiber accommodating surface each surface accommodating one fiber of the pair. The elongate member has one tapered end for ease of insertion into said cable and has at the other end a stop surface to prevent over insertion. The transverse cross section of the elongate member is substantially rectangular, with opposed curved sides adjacent the fiber accommodating surfaces. The extent of the elongate member between the curved sides is substantially equal to the inner diameter of the cable. The distance between the fiber accommodating surfaces of the elongate member is defined by the relationship:

$d_a > (d_i - 2 d_f)$; where $d_a$ is the distance between the fiber accommodating surfaces; $d_i$ is the inner diameter of the cable; and $d_f$ is the fiber diameter.

DETAILED DESCRIPTION OF THE PREFERRED EMBODIMENT

Figure 1:
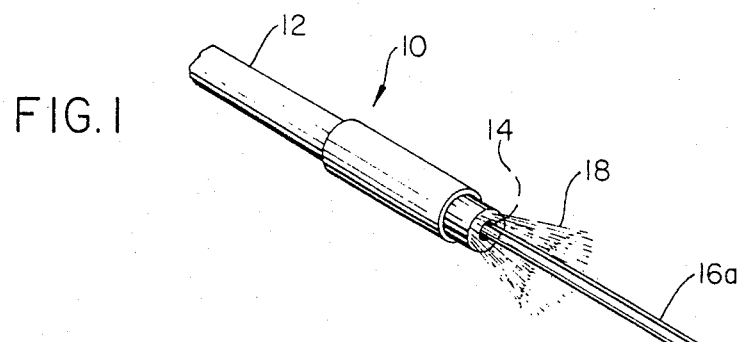
FIG. 1 is a perspective showing of a segment of an optical cable having a pair of fibers extending therethrough.

Referring to FIG. 1 there is shown an extent of optical cable 10 which comprises an outer plastic tubular jacket 12 having a central bore 14 therethrough. A pair of optical fibers 16a and 16b extend through the tubular jacket 12. In the present illustrative embodiment cable 10 includes a pair of optical fibers, however it is contemplated that cables having any number of fibers may be used in connection with the present invention. Stranded strengthening members 18 are interposed between the fibers 16a, 16b and the inner wall of the tubular jacket. Strengthening members 18 provide tensile support to the fibers in jacket 12. Cable 10 is of conventional construction, where the fibers 16a and 16b, typically made of glass or plastic, are loosely supported in jacket 12. The fibers 16a, 16b are loosely supported in jacket 12 so that forces applied to the outer jacket 12, such as by pulling, twisting or bending the cable 10, will not be transmitted to the fibers 16a, 16b. Thus the fibers are substantially freely movable longitudinally in bore 14 of cable 10. In order to terminate the cable 10 in a fiber optic connector or similar device (not shown), the outer jacket 12 is stripped back exposing an extending length of fibers 16a, 16b and of strengthening members 18.

Figure 2:
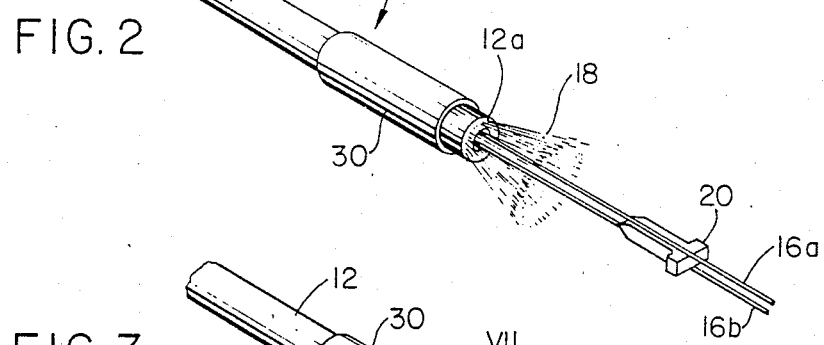
FIG. 2 shows the cable of FIG. 1 with a retaining member of the present invention shown interposed between the two extending fibers.
Figure 4:
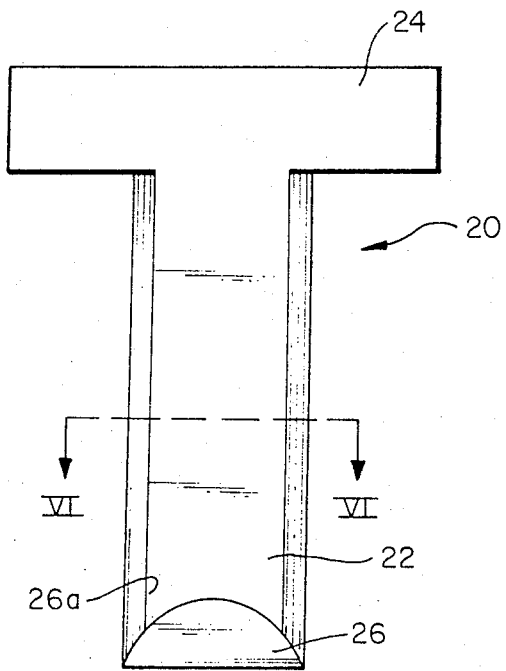
FIGS. 4 and 5 are front and side plan views respectively of the retaining member of the present invention.
Figure 5:
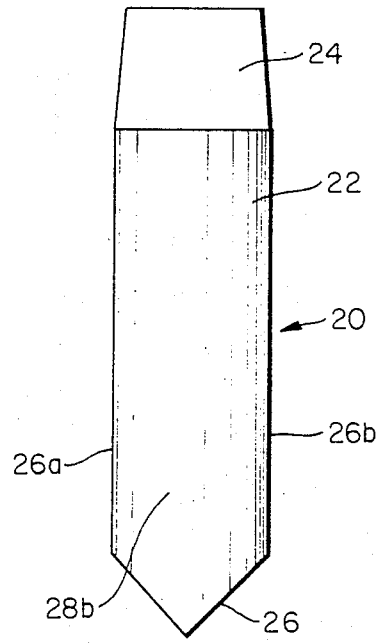

Referring now to FIG. 2, retaining member 20 is shown interposed between fibers 16a and 16b. Retaining member 20 is typically formed of a semi-rigid plastic such as Hytrel 46 sold by E. I. DuPont & Co. A plastic material is preferred as the retaining member 20 frictionally engages fibers 16a and 16b and thus the resilient plastic will prevent physical damage to the fiber and avoid optical microbending loss. Shown in greater detail in FIGS. 4–6, retaining member 20 has a generally a T-shaped body which includes an elongate member 22 and a transverse cross-member 24 at one end thereof.

Figure 6:
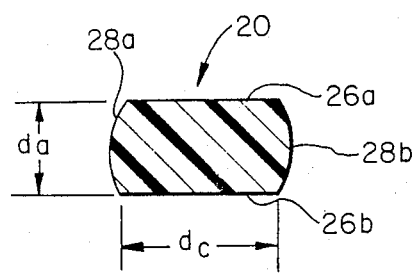
FIG. 6 is a cross section of the retaining member taken along the line VI—VI of FIG. 4.

Cross-member 24 tapers slightly toward its upper portion to prevent the fibers 16a, 16b from flexing outward when inserted into cable 10. Elongate member 22 has, at the end opposite cross member 24, a tapered wedge shaped lower portion 26 to facilitate ease of insertion into jacket 12 as will be described in greater detail hereinafter. Elongate member 22 includes a pair of opposed fiber accommodating surfaces 26a and 26b (FIG. 6). Fiber accommodating surfaces 26a and 26b are substantially flat and parallel to one another along the surfaces where the fibers are contacted. Adjacent the fiber accommodating surfaces 26a, 26b are a pair of opposed curved sides 28a and 28b.

Figure 3:
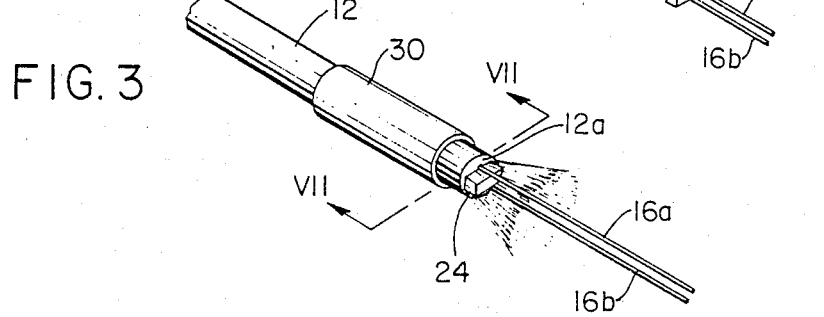
FIG. 3 shows the cable of FIGS. 1 and 2 with the retaining member in place in the cable.

As shown in detail in FIGS. 2 and 3 the fibers 16a, 16b are separately supported on cable accommodating surfaces 26a, 26b respectively. The tapered insertion end 26 of retaining member 20 is manually inserted into bore 14 of jacket 12 until cross member 24 abuts against the end 12a of cable 12. Cross member 24 has a transverse extent which is greater than the inner diameter of tubular jacket 12, thus forming a stop surface preventing over insertion of the retaining member 20 into jacket 12. A collar or sleeve 30, which is preferably formed of metal may be slipped over jacket 12 and placed adjacent end 12a, to both support retaining member 20 and to serve as an engaging surface for termination with an optical connector (not shown).

Figure 7:
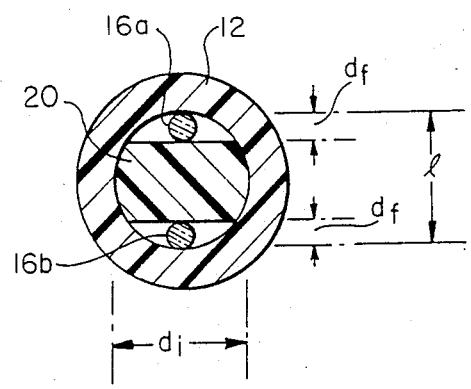
FIG. 7 is a cross section of the cable/retainer combination taken along the lines VII—VII of FIG. 3.

Referring now to FIGS. 6 and 7, the principle of the present invention may best be described. As the fibers 16a, 16b are loosely contained in tubular jacket 12, the present invention look towards providing a point at which the fibers will be substantially fixed so that upon termination, the extending portions of fibers 16a and 16b will not back into jacket 12.

The retaining member 20 is constructed so that the distance as measured between the curved sides 28a, 28b (dc) is substantially equal to the inner diameter (di) of jacket 12. Thus this extent of retaining member 20 will pass into cable jacket 12 without much resistance, yet will be suitably frictionally retained therein.

An interference fit, between the inner wall of jacket 12 and fibers 16a 16b, frictionally supports and retains the fibers therein.

In order to provide such an interference fit of the fibers 16a, 16b between the retaining member 20 and the inner wall of jacket 12, the retaining member 20 is constructed to have a distance (da) as measured between the fiber accommodating surfaces 26a, 26b which is greater than the distance between the fibers 16a and 16b when each is held against diametrically opposed inner surfaces of jacket 12. More simply, distance (da) of retaining member 20 must be greater than the inner diameter (di) of jacket 12 minus the combined diameters (df+df) of fibers 16a, 16b. Defined mathematically:

$$da > (di - 2df).$$

It is contemplated that upon insertion of retaining member 20 into jacket 12, the fibers 16a, 16b will be forced against the inner wall jacket 12. The inner wall of jacket 12, which is made of suitably resilient plastic, will deform slightly to accommodate the retaining member 20 and the fibers 16a, 16b and thus frictionally support the fibers thereat. While not rendering the fibers totally immovable in jacket 12, such frictional support at the retaining member 20 will be sufficient to prevent the fibers 16a, 16b from inadvertently backing into cable jacket 12 upon termination of fibers 16a, 16b.

While the present illustrative embodiment describes a retaining member 20 having a pair of opposed fiber accommodating surfaces 26a, 26b, it is within the contemplation of the present invention to provide a retaining member which will accommodate cable having a single fiber therein or cable which may have any number of plural fibers therein. The presently described preferred embodiments and practices are accordingly intended as descriptive and not limiting. The true scope of the invention is set forth in the following claims.

I claim:

1. A device for separating and supporting a plurality of optical fibers extending from a tubular optical cable comprising:
   an elongate member havining an insertion end for inserting into said tubular cable and having a plurality of fiber accommodating surfaces along the longitudinal extent thereof, said elongate member being dimensioned for placing said fibers in frictional engagement between said fiber accommodating surfaces and the inner wall of said tubular cable; and
   a stop member at the end of said elongate member opposite said insertion end for preventing over insertion of said elongate member into said cable.

2. The device in accordance with claim 1 wherein each of said plurality of fiber accommodating surfaces accommodates a single fiber.

3. The device in accordance with claim 1 wherein said insertion end of said elongate member is tapered for facilitating ease of insertion into said tubular cable.

4. The device in accordance with claim 3 wherein said stop member is a transverse member having an extent greater than the inner diameter of said tubular cable.

5. The device in accordance with claim 4 wherein said cable includes a pair of optical fibers extending therefrom and said elongate member has a pair of opposed spaced-apart fiber accommodating surfaces, each surface accommodating one fiber of said pair.

6. The device in accordance with claim 5 wherein said elongate member has substantially a rectangular transverse cross section, the opposed sides of said elongate member adjacent said opposed fiber accommodating surfaces being curved and having a distance between said opposed curved sides which is substantially equal to said inner diameter of said cable.

7. The device in accordance with claim 6 wherein said cable is resilient and the distance between said opposed fiber accommodation surfaces of said elongate member is defined by the relationship $$da > (di - 2df)$$

where
   da is the distance between said fiber accommodation surfaces of the elongate member;
   di is said inner diameter of said cable; and
   df is the diameter of each of said fibers.

8. A device for retaining a fiber having a given fiber diameter in an elongate tubular, resilient optical fiber cable comprising:
   an elongate member having an insertion end for insertion into said cable;
   a fiber accommodating surface on said elongate member for supporting said fiber and holding said fiber in frictional engagement between an inner wall of said tubular cable and said fiber accommodating surface, said elongate member having a given transverse dimension, said given dimension being greater than the quantity of the inner dimension of said tubular cable minus the given fiber diameter.

9. The device in accordance with claim 8 wherein said elongate member includes a stop surface at the end opposite said insertion end having an extent greater than the inner diameter of said cable, for preventing over-insertion of said elongate member.

10. The device in accordance with claim 9 wherein said insertion end of said elongate member is tapered.